(12) United States Patent
Stelman (10) Patent No.: US 6,224,786 B1
(45) Date of Patent: May 1, 2001

(54) ELIMINATION OF ANOMALOUS FREEZING OF BASIC HYDROGEN PEROXIDE IN THE CHEMICAL OXYGEN IODINE LASER

(75) Inventor: David Stelman, Thousand Oaks, CA (US)

(73) Assignee: The Boeing Company, Seattle, WA (US)

( * ) Notice: Subject to any disclaimer, the term of this patent is extended or adjusted under 35 U.S.C. 154(b) by 0 days.

(21) Appl. No.: 09/441,428

(22) Filed: Nov. 16, 1999

(51) Int. Cl.[7] .......................... C01B 15/037; H01S 3/22; H01S 3/095

(52) U.S. Cl. ................ 252/183.14; 252/186.28; 252/186.43; 252/1; 423/584; 372/89; 372/55

(58) Field of Search .................. 252/186.1, 186.28, 252/186.43, 183.14; 423/582, 584; 372/55, 89

(56) References Cited

U.S. PATENT DOCUMENTS

| | | | |
|---|---|---|---|
| 4,246,252 | * 1/1981 | McDermott et al. | 423/579 |
| 4,310,502 | * 1/1982 | Wagner | 423/579 |
| 4,927,509 | * 5/1990 | Mathur et al. | 204/83 |
| 5,378,449 | * 1/1995 | Dinges | 423/579 |
| 5,507,935 | * 4/1996 | Coleman et al. | 204/409 |
| 5,624,654 | 4/1997 | Clendening, Jr. et al. | 423/579 |
| 5,658,488 | * 8/1997 | Lonergan et al. | 252/186.43 |
| 5,859,863 | 1/1999 | Clendening, Jr. et al. | 372/39 |
| 6,004,449 | * 12/1999 | Vetrovec | 205/466 |
| 6,010,640 | * 1/2000 | Beshore et al. | 252/183.14 |

FOREIGN PATENT DOCUMENTS 0 819 647 A2    1/1998    (EP).

* cited by examiner

Primary Examiner—Joseph D. Anthony
(74) Attorney, Agent, or Firm—Harness Dickey & Pierce P.L.C.

(57) ABSTRACT

A basic hydrogen peroxide composition is described, wherein the basic hydrogen peroxide is formed by mixing aqueous potassium hydroxide and aqueous hydrogen peroxide in a mole ratio such that the resulting basic hydrogen peroxide composition does not crystallize when maintained at a temperature down to −21° C. The basic hydrogen peroxide composition is especially suitable for use with chemical oxygen iodine laser systems. The mole ratio of hydrogen peroxide to potassium hydroxide corresponds to a composition represented by at least one location within a triangular region on a triangular phase diagram which is substantially bounded by the shortest line having coordinates (26.4, 16.0, 57.6), (62.3, 37.7, 0.0), and (46.8, 53.2, 0.0), wherein these coordinates correspond to the respective weight percentages of potassium hydroxide, hydrogen peroxide and water.

9 Claims, 9 Drawing Sheets

ELIMINATION OF ANOMALOUS FREEZING OF BASIC HYDROGEN PEROXIDE IN THE CHEMICAL OXYGEN IODINE LASER

TECHNICAL FIELD

The present invention relates generally to chemical laser systems, and more particularly to a basic hydrogen peroxide composition and a method of making the same, wherein the basic hydrogen peroxide composition does not freeze or crystallize during routine operation of a chemical oxygen iodine laser (COIL) system.

BACKGROUND OF THE INVENTION

The fact that an atom will emit a photon of radiation when one of its electrons drops to a lower energy state has enabled the laser to be employed in a number of military, industrial, and medical applications. The term "laser" is an acronym for light amplification by stimulated emission of radiation. In its simplest form, a laser consists of a rod of transparent crystal or a tube filled with gas or liquid. A mirror is placed at one end and a half-silvered mirror at the other end. The laser is then "pumped" by adding energy, e.g., by shining another light source into it, by adding electrical energy, or by stimulating a chemical reaction. This process raises electrons in the laser to higher energy states.

During the pumping process, some of the electrons will spontaneously fall back to a lower energy state, emitting photons. The photons that travel toward the sides of the laser are quickly lost, but those traveling along the length of the rod or tube are reflected back by the mirrors. This activity generally occurs in the area commonly referred to as the laser gain region. When these photons strike other excited atoms, they stimulate those atoms to release photons of the exact same energy level (or wavelength), which travel in the same direction as the stimulating photons. The result is an intense, highly focused beam of light escaping through the half-silvered end of the laser. This light beam is generally referred to as a beam of high energy coherent radiation, or more commonly, a laser beam.

Because the photon wavelength is determined by the characteristics of the atoms in the lasing material, laser light is of a single wavelength. Because laser light travels in a tight beam, it can carry a great deal of energy over a great distance without significant loss. With respect to recent developments in laser technology, there has been increased interest in chemical laser systems, especially COIL systems.

The COIL system was initially developed for military applications;

however, recent attention has turned to potential industrial uses of COIL systems, such as metal cutting applications.

In a COIL system, chlorine gas reacts with a solution of basic hydrogen peroxide (i.e., usually KOH or NaOH mixed with hydrogen peroxide) to produce a gaseous flow of excited oxygen, also referred to as singlet delta oxygen or singlet molecular oxygen (designated as $O_2^*$, $O_2(^1\Delta)$, as well as by other symbols). This gaseous flow of singlet delta oxygen collides (typically at speeds approaching or even exceeding the speed of sound) with iodine gas molecules (i.e., $I_2$), dissociating them and exciting the resulting iodine atoms (i.e., I), which lase at 1.315 μm. The major laser byproducts are various salts (e.g., NaCl or KCl) and heat. The small amounts of iodine can be scrubbed from the output.

The intended operation of a conventional COIL system can be summarized as follows: The initial step is to generate the singlet delta oxygen. This is accomplished by providing a source of basic hydrogen peroxide, typically in liquid form, and a source of molecular chlorine, typically in gaseous form. These two materials are then charged or injected into a singlet delta oxygen generator through appropriate manifold/conduit assemblies, respectively. The resulting exothermic reaction between the basic hydrogen peroxide liquid and the molecular chlorine gas produces the gaseous singlet delta oxygen, as well as several by-products, such as salt and heat. The heat can be removed by appropriate devices such as a heat exchanger, and the salt can be removed by appropriate devices such as a scrubber.

Once the gaseous singlet delta oxygen is generated, it is then charged or injected in flow form into a mixing nozzle at the appropriate time. The mixing nozzle has a throat portion which generally divides the mixing nozzle into a subsonic zone and a supersonic zone; that is, the flow of gaseous singlet delta oxygen is subsonic in one portion of the mixing nozzle and supersonic at the other portion of the mixing nozzle. The mixing of reactants is typically done in the subsonic zone.

A molecular iodine generator is in communication with the mixing nozzle by an appropriate manifold/conduit assembly. At the appropriate time, gaseous molecular iodine is then charged or injected into the mixing nozzle in such a manner so as to let it "pool" before completely mixing with the singlet delta oxygen gas flowing from the singlet delta oxygen generator. The slight delay in mixing due to this "pooling" permits the singlet delta oxygen to dissociate only some of the molecular iodine on the edge of the "pool" and thus initiate the chain reaction dissociation by the product atomic iodine.

The primary reactions taking place in connection with the conventional COIL system are as follows:

(1) $I_2+O_2* \rightarrow I_2^*+O_2$. That is, a mole of molecular iodine reacts with a mole of singlet delta oxygen to produce a mole of excited molecular iodine and a mole of molecular oxygen.

(2) $I_2^*+O_2^* \rightarrow 2I+O_2$. That is, a mole of excited molecular iodine reacts with a mole of singlet delta oxygen to produce two moles of atomic iodine and a mole of molecular oxygen.

(3) $I+O_2^* \rightarrow I^*+O_2$. That is, a mole of atomic iodine reacts with a mole of singlet delta oxygen to produce a mole of excited atomic iodine and a mole of molecular oxygen.

(4) $I^* \rightarrow I+h\nu$. That is, a mole of excited atomic iodine releases a photon (hν), thus producing a mole of atomic iodine.

The singlet delta oxygen gas flow initially contacts the gaseous molecular iodine "pool" at subsonic speed; however, the singlet delta oxygen gas flow is quickly brought up to near supersonic or even supersonic speed (via appropriate devices such as a venturi) and is expelled out through the mixing nozzle into the area known as the laser gain region. It is in this area where the excited atomic iodine releases its photon. The released photon is then reflected many times between a set of mirrors, the first mirror being fully reflective, the second mirror being partially reflective. The reflected photons eventually form a laser beam, which is transmitted through the partially reflective mirror at a wavelength of 1.315 μm. Any remaining chemical species are removed from the laser gain region by a combination of exhaust assemblies and scrubber assemblies in order to avoid contamination of the laser's mirrors.

At times, the COIL system experiences unpredictable and unexplainable anomalous freezing of the potassium basic hydrogen peroxide (K-BHP) even though the system was operating at temperatures 10° C. above the known freezing point of the BHP. The formation of solids in the BHP plugs the singlet oxygen generator and causes the laser to cease operating. That fact that the system operates without a problem on some occasions, and at the same conditions it unexpectedly freezes on other occasions has defied explanation since the system is operating well above the known freezing point of BHP. This problem has occurred at numerous COIL system facilities and has been an ongoing problem for the COIL system for several years.

Accordingly, there has been increased interest involving the part of the process that involves BHP. Generally, the BHP is prepared by reacting aqueous solutions of KOH and $H_2O_2$ to form aqueous KOOH. The accepted phase diagram for the KOH, $H_2O_2$, $H_2O$ system was determined by Dobrynina, et al., Bulletin of the Academy of Sciences, USSR, Division of Chemical Sciences, Volume 34, Page 2451 (1968). The phase diagram is shown in FIG. 1 after re-plotting their data on a KOH, $H_2O_2$, and $H_2O$ axis system.

Figure 1:
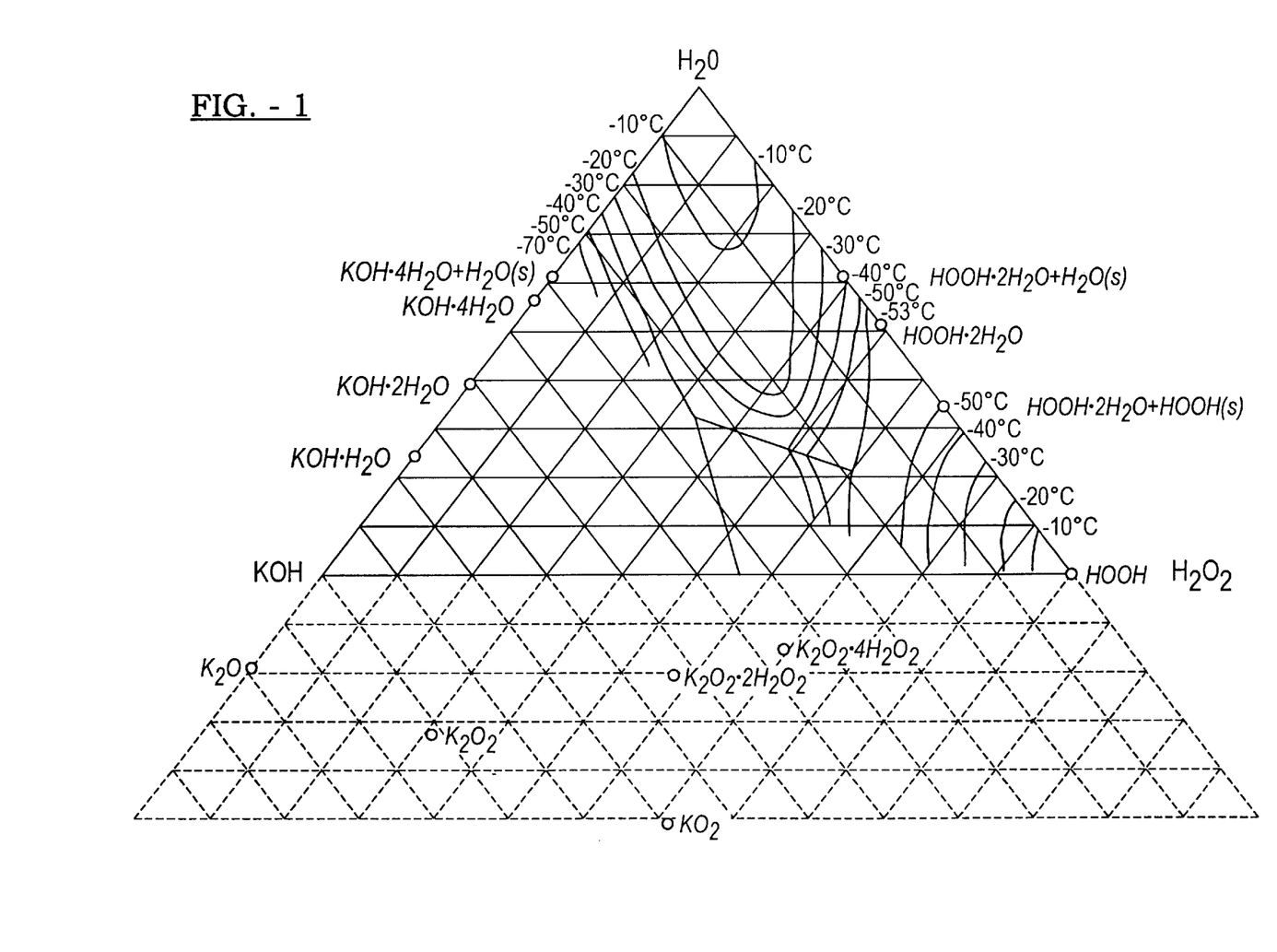
FIG. 1 is an illustration of the KOH—$H_2O_2$—$H_2O$ (BHP) phase diagram.

Referring to FIG. 1, a phase diagram for K-BHP, expressed in weight percent (wt. %), is shown. The triangle drawn with solid lines represents the domain of 0% to 100% concentration for the KOH, $H_2O_2$, $H_2O$ system. The dashed lines correspond to negative concentrations of $H_2O$. Any point in the figure represents a mixture of the three components. The sum of the three constituents at any point adds up to 100%. The open circles show the composition of various compounds. The curved lines (referred to as isotherms) show the composition where the liquid phase is in equilibrium with the solid phase at a given temperature. The isotherm temperatures are labeled around the edge of FIG. 1. If the temperature is cooled below the equilibrium or saturation temperature, a solid compound will crystallize out of the solution and the composition of the remaining liquid will change accordingly. The reason FIG. 1 has negative compositions is that it has been re-plotted on a different axis system than Dobrynina, et al., who used an axis system based on $K_2O$, $\frac{1}{2}O_2$, and $H_2O$. Some of the compounds shown in Dobrynina, et al. are located in the negative area of FIG. 1. However, the KOH, $H_2O_2$, $H_2O$ axis system shown in FIG. 1 is more convenient for preparing BHP because these are the actual reagents used to prepare BHP, and the relative amounts of the three components can be read directly off of FIG. 1, without having to perform any calculations.

As previously noted, BHP is typically prepared by mixing aqueous KOH and aqueous $H_2O_2$. KOH is commercially produced as a 50% solution, and is generally available as a 50% or 45% solution. The 45% KOH is most commonly used because 50% KOH freezes in cold weather. The strongest commercially available hydrogen peroxide is 70% $H_2O_2$. BHP is typically made from these commercially available reagents. Their composition is shown in FIG. 2.

Figure 2:
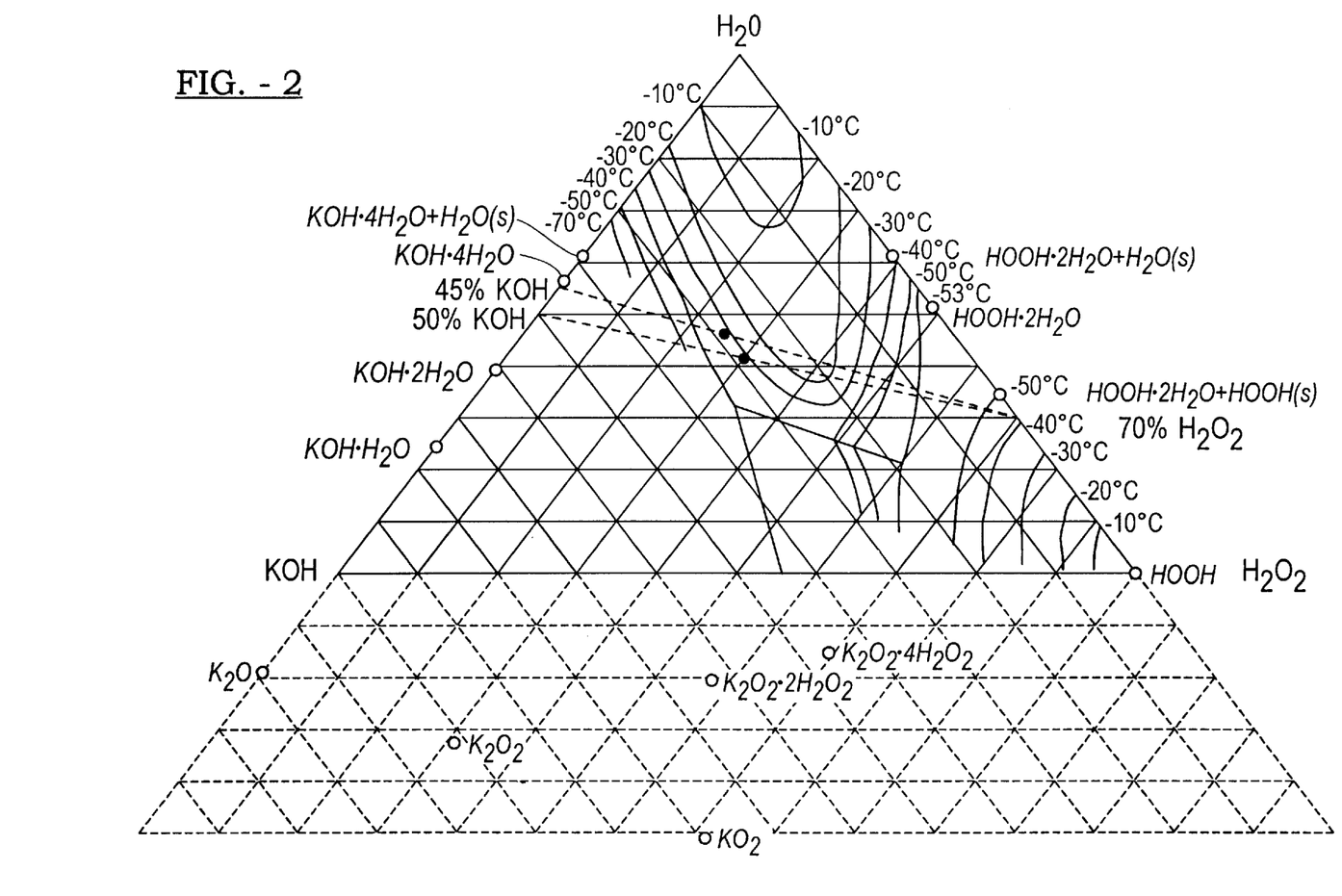
FIG. 2 is an illustration of the BHP phase diagram depicted in FIG. 1 showing the 45% KOH-70% $H_2O_2$ and 50% KOH-70% $H_2O_2$ mix lines.

Referring to FIG. 2, dashed lines are drawn between 45% KOH and 70% $H_2O_2$ and between 50% KOH and 70% $H_2O_2$. The compositions that can be prepared by mixing the KOH solution with the $H_2O_2$ solution must lie on the corresponding mix line.

Several factors determine the desired operating conditions. At ambient temperatures, BHP decomposes readily liberating a large amount of heat. Therefore, the BHP temperature needs to be below ambient temperature, but above the BHP saturation or freezing temperature. Because water vapor quenches the excited iodine, it is desirable to minimize the partial pressure of the water vapor in equilibrium with the BHP. This means that the BHP temperature should be kept as low as practical without freezing. However, if the temperature is too low or too close to the freezing point, the viscosity will be high and the kinetics will be slow. If the mixture is basic (i.e., has excess KOH), the production of singlet oxygen decreases. Consequently, the mole ratio of $H_2O_2$ to KOH should be one or greater (stoichiometric or excess $H_2O_2$).

The two black dots on the two mix lines in FIG. 2 represent typical operating conditions. The composition of the two black dots is as follows. On the 45% KOH mix line, the black dot is at 28 wt. % KOH, 26 wt. % $H_2O_2$, and 46 wt. % $H_2O$ which corresponds to 7 M KOH and 10.5 M $H_2O_2$ or 7 M KOOH and 3.5 M excess $H_2O_2$ (in the subsequent description, the abbreviated term "7M/10.5M BHP" will be used to express the composition). On the 50% KOH mix line, the black dot is at 29 wt. % KOH, 30 wt. % $H_2O_2$, and 41 wt. % $H_2O$ which corresponds to 7.2 M KOH and 12.3 M $H_2O_2$ or 7.2 M KOOH and 5.1 M excess $H_2O_2$.

Operating in the vicinity of the two black dots satisfies the requirements mentioned above. They both have excess $H_2O_2$. According to phase diagram in FIG. 2, the two black dots have BHP freezing points of about –31° C. to –32° C. When operating the COIL system at a BHP temperature of –20° C., they both have low water vapor pressure, and both have a very large safety margin against freezing because the operating temperature (–20° C.) is more than 10° C. above the BHP freezing point (i.e., –31 to –32° C. according to FIG. 2).

COIL lasers have been operated successfully at these conditions for many years. However, they have also experienced unpredictable and unexplainable anomalous freezing incidents at the same conditions, even though the temperature is IOC above the BHP freezing point.

Suspecting unknown impurities as a possible cause, operators of COIL systems have cleaned their systems and replaced their reagents. However, this has not solved the problem.

Another approach to overcoming this problem is based on the order of mixing. Because BHP is less stable at high pH, it is normally prepared by adding the KOH to the $H_2O_2$. It has been suggested that when BHP is prepared in this manner, the composition passes through a maximum in the freezing point en route to the final composition (as shown in FIG. 2). This approach hypothesizes that nucleation seeds can form in the vicinity of this maximum, and because of the high viscosity, once these seeds have formed they can survive even though the composition has proceeded away from this maximum. The approach further hypothesizes that the seeds will not form and anomalous freezing incidents can be prevented: A) by keeping the mix temperature well above the maximum, say above –13° C.; or B) by adding the $H_2O_2$ to the KOH the system never passes over the maximum. Working with 7M/10.5M BHP, proponents of this approach have found that they have not had a freezing incident since the adoption of this approach. However, by the very unpredictable nature of the "anomalous freezing" phenomenon, this conclusion is premature. Furthermore, tests indicate that BHP prepared in this way is metastable and will crystallize at –20° C. when nucleation seeds form or are introduced.

Typically, only specific chemical compounds are effective as nucleation seeds. After an unexplained freezing incident, researchers analyzed the slush that formed. The result was inside the solid triangle of FIG. 1, specifically near the middle of the bottom of the solid triangle. Choosing one of the solid compounds listed on FIG. 1, they suggested that the solid might be $K_2O_2.2H_2O_2$. However, tests have indicated that the actual compound is not listed on FIG. 1.

Based on these results, the inventor of the present invention attempted to prepare this solid. A mixture of 43.8% $H_2O_2$, 43.0% KOH, and 13.2% $H_2O$ was prepared at $-20°$ C. Initially it was a thin slurry, but on standing over a weekend a large mass of crystals formed. When BHP at $-20°$ C. was seeded with this material, crystals precipitated.

Figure 3A:
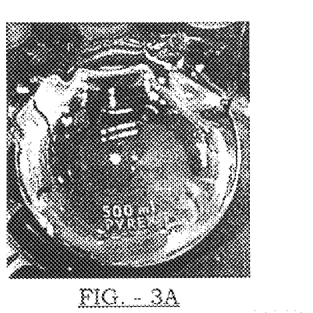
FIG. 3A is a photographic illustration of a flask containing 7.2 M/12.4 M BHP after 2.5 hours at $-20°$ C. but before seeding.

Referring to FIG. 3A, a flask containing BHP after 2.5 hours at $-200C$ but before seeding, is shown. It is a clear liquid with no solids. Six minutes after the seed was introduced, the temperature of the BHP began to rise noticeably.

Figure 3B:
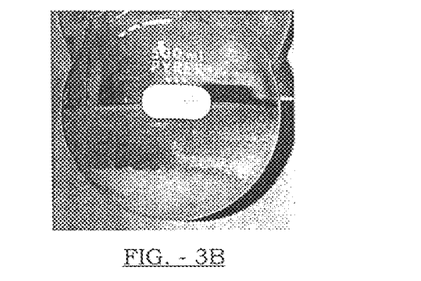
FIG. 3B is a photographic illustration of a flask containing 7.2 M/12.4 M BHP after seeding.
Figure 3C:
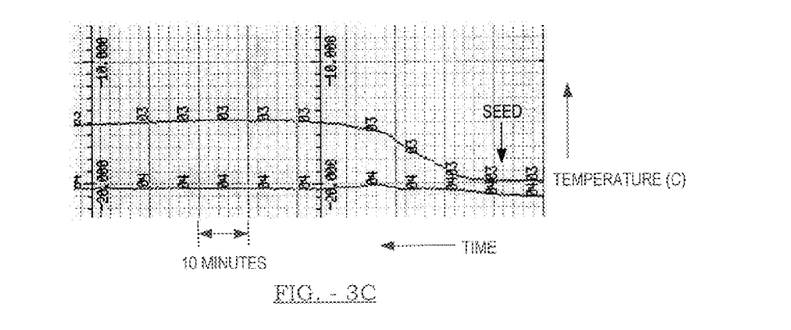
FIG. 3C a photographic illustration of a recorder trace of the temperature versus time graph of the 7.2 M/12.4 M BHP.

Referring to FIG. 3B, the same flask containing the BHP after seeding, is shown. There is about a ½ inch layer of crystals in the bottom. Referring to FIG. 3C, the recorder trace of the temperature is shown. Channel 03 is a thermocouple in the sample fluid. After seeding, the sample temperature rose from $-20$ to $-15°$ C. due to the heat of crystallization. Time increases from right to left, with each small division representing a 2 minute time period. There is an induction period of about 6 minutes, followed by a $5°$ C. temperature rise over 30 minutes. (Channel 04 is an extraneous flask.)

FIGS. 3A–C show 7.2 M/12.4 M BHP that was partially reacted with chlorine. Unreacted 7.2 M/12.4 M BHP at $-20°$ C. also crystallized after seeding. For comparison purposes, 7 M/10.5 M BHP was prepared in four different ways. It was been prepared at $+5°$ C. by adding the $H_2O_2$ to the KOH, and by adding KOH to $H_2O_2$. It was also prepared at $-21°$ C. by adding the $H_2O_2$ to the KOH, and by adding KOH to $H_2O_2$. All four batches yielded solid-free liquid at $-20°$ C. However, all four solutions crystallized at $-20°$ C. when nucleation seeds were introduced. Thus, 7M/10.5M BHP at $-20°$ C. is not in its equilibrium state. It reaches equilibrium by crystallizing. The unpredictable part of the process is the rate of formation of crystal nucleation seeds. Once a sufficient number of seeds form or are introduced, crystallization takes place.

Therefore, there is a need for a BHP composition that will not freeze or crystallize during the routine operation of a conventional COIL system, i.e., at temperatures down to $-21°$ C. There is also a need for a method for preventing the freezing or crystallizing of BHP during the routine operation of a conventional COIL system.

BACKGROUND ART

European Patent Application EP0819647A2 discloses that basic hydrogen peroxide used in chemical lasers can be produced using a lithium based lithium hydroxide with a lithium hydroxide makeup of the reacted basic hydrogen peroxide. Lithium hydroxide, water and hydrogen peroxide are mixed and 1) passed over a lithium hydroxide solid bed or 2) premixed with small particulate solid lithium hydroxide or lithium hydroxide monohydrate. The basic hydrogen peroxide produced is chilled and stored cold until mixed with chlorine to produce singlet delta oxygen for use in the chemical oxygen iodine laser. The spent basic hydrogen peroxide is rejuvenated by passing it over a solid lithium hydroxide or in-situ solid particulate lithium hydroxides. After dissolution, the rejuvenated basic hydrogen peroxide is then reacted with chlorine to produce more singlet delta oxygen.

U.S. Pat. Nos. 5,624,654 and 5,859,863 both disclose a system for preparing excited molecular oxygen in the excited singlet-delta electronic state for use in a chemical laser that minimizes salt formation utilizing the common ion effect. In one version, basic hydrogen peroxide is formed by combining $H_2O_2$ and at least two bases. In another version of the invention, the basic hydrogen peroxide is reacted with a gas containing at least two halogen species.

SUMMARY OF THE INVENTION

It is therefore an object of the present invention to provide a new and improved basic hydrogen peroxide composition.

It is another object of the present invention to provide a new and improved method for making a basic hydrogen peroxide composition.

In accordance with one embodiment of the present invention, a basic hydrogen peroxide composition is provided, wherein the basic hydrogen peroxide is formed by mixing aqueous potassium hydroxide and aqueous hydrogen peroxide in a mole ratio such that the resulting basic hydrogen peroxide composition does not crystallize when maintained at a temperature down to $-21°$ C.

In accordance with another embodiment of the present invention, a basic hydrogen peroxide composition is provided, wherein the basic hydrogen peroxide is formed by mixing aqueous potassium hydroxide and aqueous hydrogen peroxide, wherein the mole ratio of hydrogen peroxide to potassium hydroxide corresponds to a composition represented by at least one location within a triangular region on a triangular phase diagram which is substantially bounded by the shortest line having coordinates (26.4, 16.0, 57.6), (62.3, 37.7, 0.0), and (46.8, 53.2, 0.0), wherein these coordinates correspond to the respective weight percentages of potassium hydroxide, hydrogen peroxide and water.

In accordance with still another embodiment of the present invention, a method is provided for the prevention of the crystallization of basic hydrogen peroxide during the operation of a chemical oxygen iodine laser system, wherein the basic hydrogen peroxide is formed by mixing aqueous potassium hydroxide and aqueous hydrogen peroxide, comprising:

maintaining the mole ratio of the hydrogen peroxide to the potassium hydroxide to a composition represented by at least one location within a triangular region on a triangular phase diagram which is substantially bounded by the shortest line having coordinates (26.4, 16.0, 57.6), (62.3, 37.7, 0.0), and (46.8, 53.2, 0.0), wherein these coordinates correspond to the respective weight percentages of potassium hydroxide, hydrogen peroxide and water.

Additional objects, advantages, and features of the present invention will become apparent from the following description and appended claims, taken in conjunction with the accompanying drawings.

BRIEF DESCRIPTION OF THE DRAWINGS

The various advantages of the present invention will become apparent to one skilled in the art by reading the following specification and subjoined claims and by referencing the following drawings in which:

DETAILED DESCRIPTION OF THE PREFERRED EMBODIMENTS

The following discussion of the preferred embodiments directed to the composition of BHP for a COIL system are merely exemplary in nature, and is in no way intended to limit the invention or its applications or uses.

The present invention demonstrates that the accepted phase diagram of BHP has regions that are actually supercooled. These regions are metastable. The BHP can exist in this unstable condition for an extended time, but when sufficient numbers of nucleation seeds are formed or introduced, the BHP will almost certainly freeze every time. The solid compound that forms has now been identified. This compound is not on the accepted phase diagram of BHP. The present invention describes and defines a region where this compound cannot exist at the desired operating temperature of a conventional COIL system and therefore these unexpected freezing events cannot occur.

Before the freezing problem could be overcome by the present invention, it was first necessary to identity the solids produced. Several of these mixtures were analyzed after precipitation. The mixtures were filtered at −20° C. The filtered liquids and the damp filter cakes were analyzed. However, before presenting the results of the analysis, a hypothetical example is given to show the expected relationship on a three component Gibbs composition plot.

Figure 4:
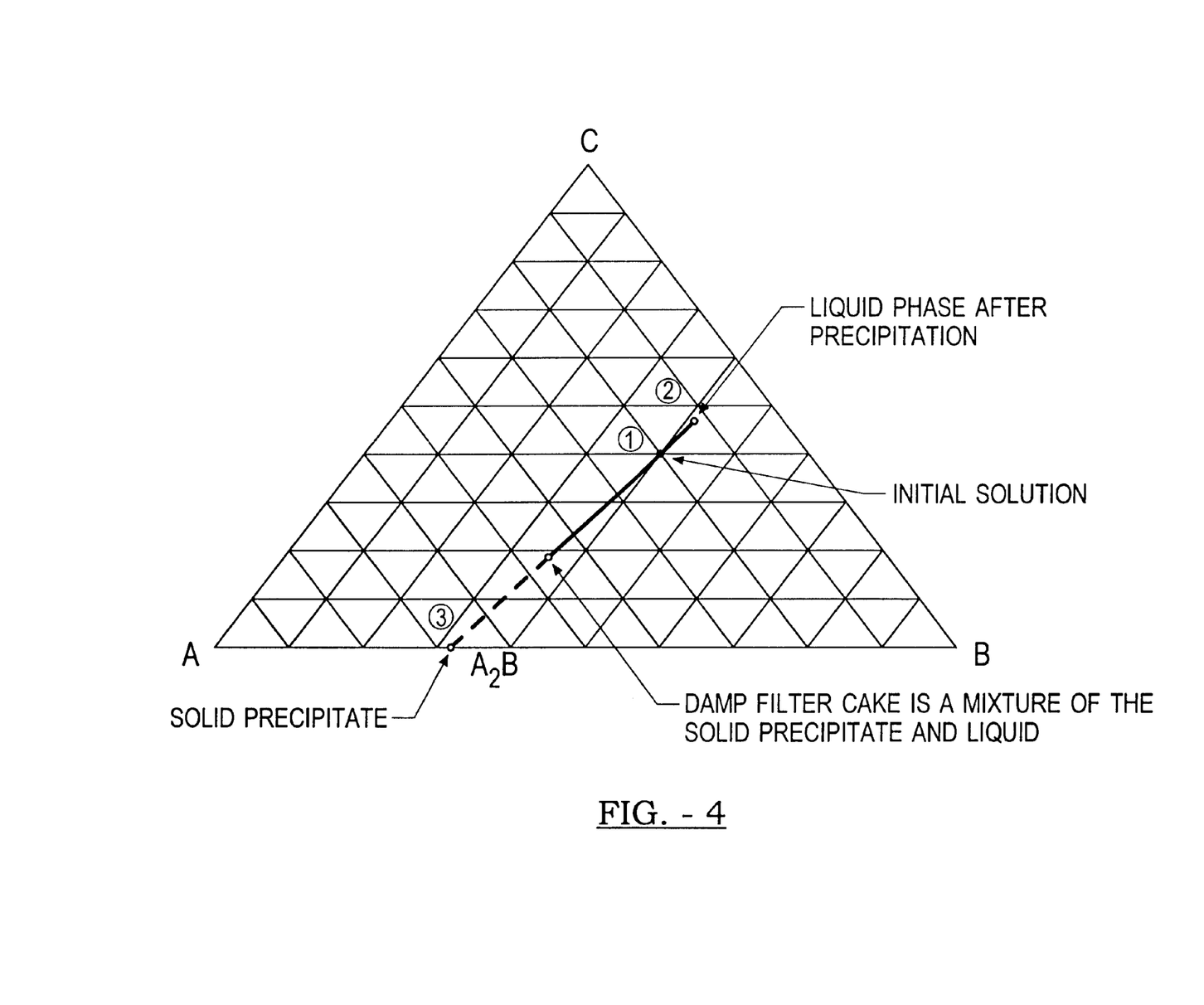
FIG. 4 is an illustration of a hypothetical three component Gibbs composition plot.

Referring to FIG. 4, a system with 3 components A, B and C, is shown. Each vertex represents 100% of that component. Point 1 is a hypothetical solution of composition 20% A, 40% B, and 40% C. If that solution is cooled until a solid precipitate forms, the compositions of the original solution 1, the new liquid phase 2 after precipitation, and the solid precipitate 3 will all lie on a straight line. In practice, the pure solid precipitate cannot be isolated. The filter cake is wet, and is a mixture of the precipitate and the liquid. The composition of the wet filter cake also lies on the same line between the precipitate and the original solution. The solid phase can be identified from a plot of the compositions of the damp filter cake and the liquid filtrate because a line drawn through these two points will pass through the composition of the pure solid. The quantity of each phase can also be determined from the plot if the solid can be identified. The original solution lies at the center of gravity of the system. That is, the weight of liquid multiplied by its distance from the original solution equals the weight of precipitate multiplied by its distance from the original solution. Put another way, the ratio of the weights of the solid to the liquid is inversely proportional to the ratio of their distance from the original solution.

Figure 5:
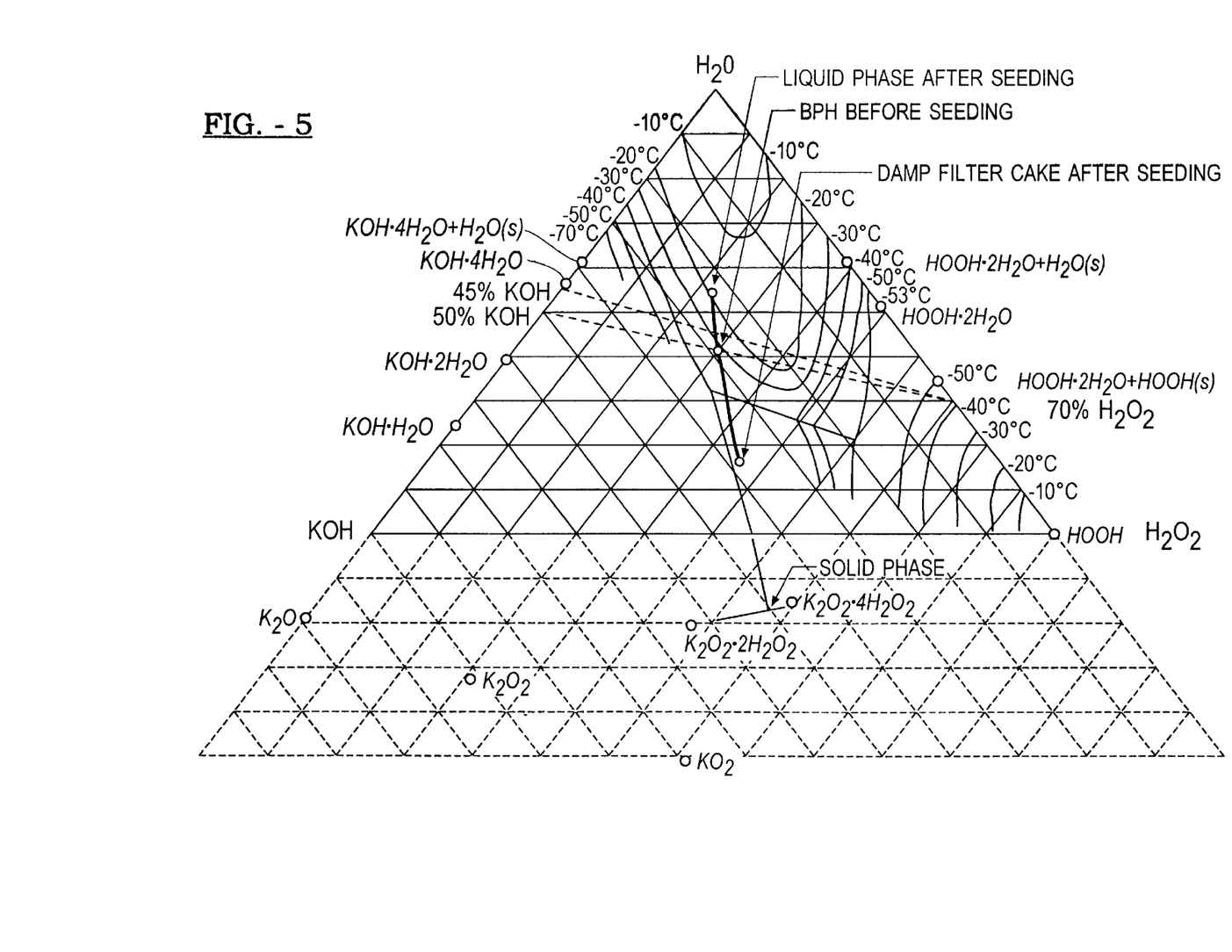
FIG. 5 is an illustration of the BHP phase diagram depicted in FIG. 1, showing the compositions of 7.2 M/12.4 M BHP before and after seeding at −20 C.

Referring to FIG. 5, the compositions of 7.2 M/12.4M BHP before seeding, and the liquid and damp solid after seeding, are shown. The three points are connected by a heavy line (slightly inclined from the vertical).

As illustrated in the example shown in FIG. 4, these three points should lie on a straight line. However, the actual line shown in FIG. 5 is not quite straight, but it is fairly close to being straight. Extension of that line through the damp filter cake should pass through the actual solid. The extension passes between $K_2O_2.2H_2O_2$ and $K_2O_2.4H_2O_2$. Assuming that the solid is a mixture of these two compounds, it would be located on the line joining these two compounds. The intersection between the line connecting these two compounds and the line through the filtrate and the filter cake is labeled as "Solid Phase." The composition at the intersection can be expressed as a compound whose formula is $K_2O_2.nH_2O_2$. When such a compound is analyzed, the $K_2O_2$ reacts with $H_2O$ to form $2KOH+H_2O_2$. Thus, $K_2O_2.nH_2O_2$ would analyze as $2KOH+(n+1)H_2O_2$. Normalized to KOH, the result would be 1 KOH to $(n+1)/2H_2O_2$. The Table below gives the molar ratio of $H_2O_2$ to KOH that would be obtained from the analysis of $K_2O_2.2H_2O_2$ and $K_2O_2.4H_2O_2$, and the results of the analysis of the slush from "anomalous" freezing events at the COIL laser facility at Rocketdyne's Field Laboratory (CWLL) in Santa Sussana, Calif., the slush from "anomalous" freezing events during Rocketdyne tests of the COIL laser at Air Force Phillips Laboratory (AFPL) at Kirkland AFB, New Mexico, and from laboratory seeding tests described above.

TABLE

| Source | Mole ration of $H_2O_2$ to KOH |
| --- | --- |
| $K_2O_2 \cdot 2H_2O_2$ | 1.5 |
| CWLL | 1.9 |
| AFPL #1 | 1.9 |
| Laboratory Test #1 | 2.0 |
| Laboratory Test #2 | 2.0 |
| AFPL #2 | 2.1 |
| $K_2O_2 \cdot 4H_2O_2$ | 2.5 |

Within the experimental accuracy, all of the observed solids were the same. The mole ratio of $H_2O_2$ to KOH was 2.0±0.1. This corresponds to a compound wherein n=3. Thus, the solid compound that forms has been identified for the first time. The composition (but not necessarily the structure) of this compound can be expressed as $K_2O_2.3H_2O_2$ or equivalently as $KOOH.H_2O_2$. This compound is not on the accepted phase diagram of BHP as shown in FIG. 1.

The real problem is that part of the accepted BHP phase diagram in FIG. 1 is at non-equilibrium conditions. The present invention demonstrates that the accepted phase diagram of BHP shown in FIG. 1 has regions that are actually super-cooled. COIL system operators have unknowingly chosen to operate in a non-equilibrium, super-cooled region. This region is metastable. The BHP can exist in this unstable condition for an extended time, but when sufficient numbers of nucleation seeds are formed or introduced, the BHP will crystallize every time. Furthermore, the more seeds present, the faster it crystallizes. The crystallization time can be varied from minutes to hours.

The present invention described and defines a region where the compound, $K_2O.3H_2O_2$, cannot exist at the desired operating temperature, i.e., $-20°$ C., and these unexpected freezing events cannot occur.

Figure 6:
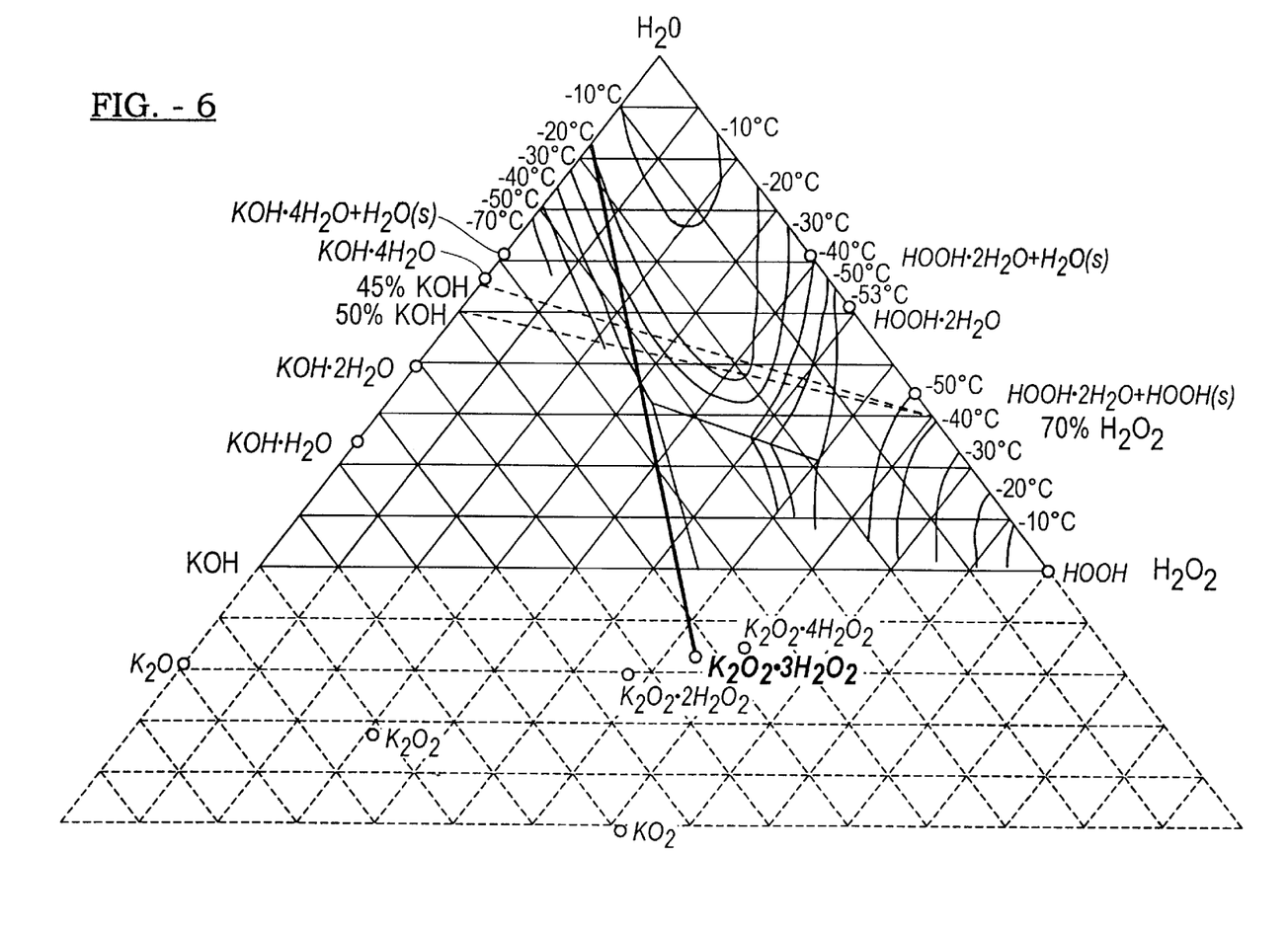
FIG. 6 is an illustration of the BHP phase diagram depicted in FIG. 1, after a line drawn from $K_2O_2.3H_2O_2$ to the saturation concentration of aqueous KOH at −20° C. has been added to the phase diagram.

Referring to FIG. 6, the compound $K_2O_2.3H_2O_2$ has been added to the BHP phase diagram, is shown.

In FIG. 6, a line has been drawn from $K_2O_2.3H_2O_2$ to the saturation concentration of aqueous KOH at $-20°$ C. The saturation concentration of aqueous KOH at $-20°$ C. is about 17.6 wt. % KOH, 82.4 wt. % $H_2O$. By the conservation of mass, any point to the left of that line cannot form a liquid that will be in equilibrium with solid $K_2O_2.3H_2O_2$ at $-20°$ C. or higher temperatures. Of course, this does not preclude equilibrium with some other compound at $-20°$ C., but it does preclude the formation of the solids observed at CWLL, AFPL, and in the laboratory at $-20°$ C.

For greater production of singlet oxygen, the COIL system is typically operated with the mole ratio of $H_2O_2$ to KOH equal to or greater than 1.

Figure 7:
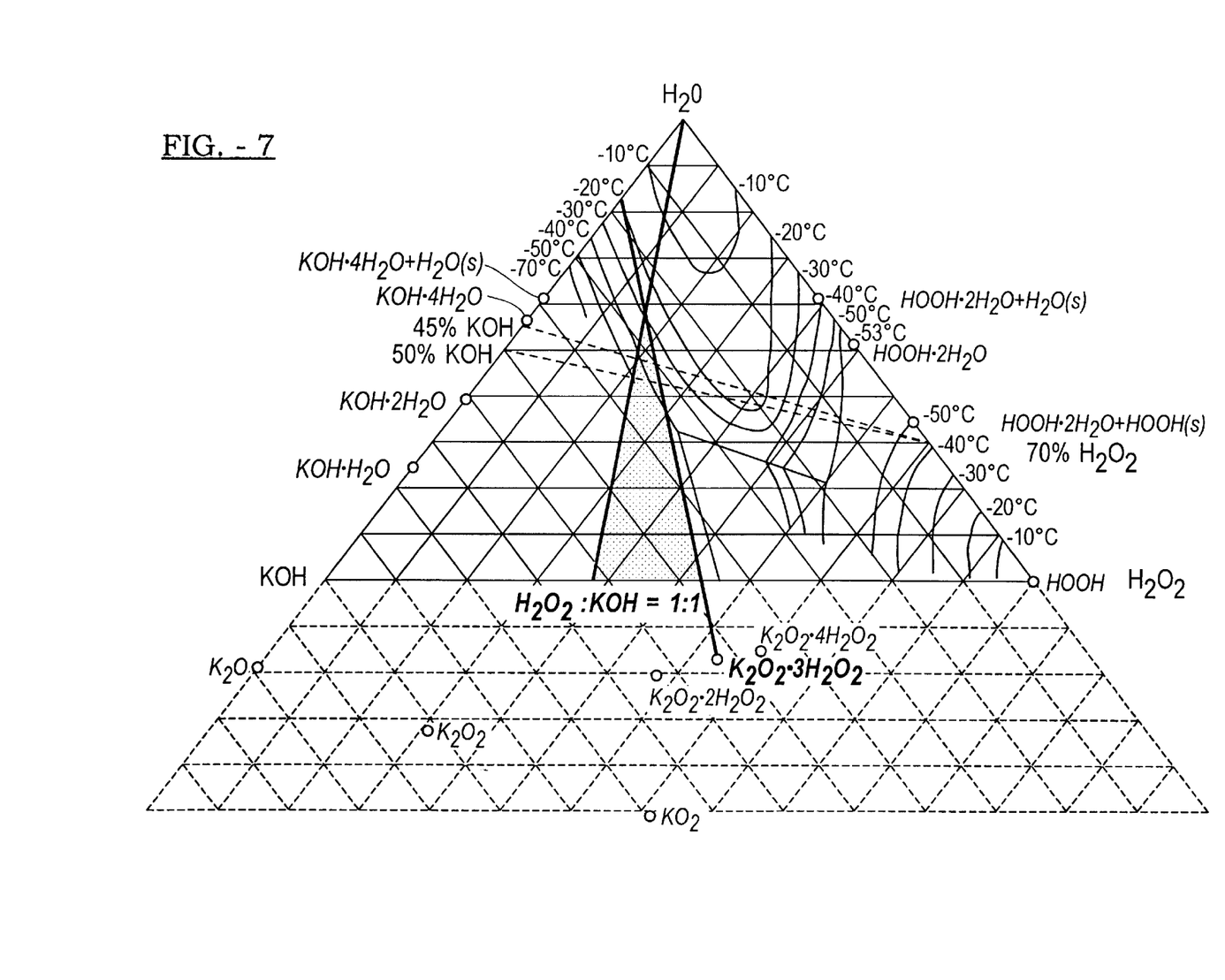
FIG. 7 is an illustration of the BHP phase diagram depicted in FIG. 6, after a line drawn for the 1:1 mole ratio of $H_2O_2$ and KOH have been added to the phase diagram.

Referring to FIG. 7, it should be noted that the phase diagram depicted in FIG. 7 is essentially the same as that of FIG. 6, except that it has one additional line—the line for the 1:1 mole ratio of $H_2O_2$ and KOH. The shaded triangular area shows the boundaries which have a $H_2O_2$:KOH mole ratio of 1 or greater and cannot form solid $K_2O_2.3H_2O_2$ at $-20°$ C., thus preventing the unexpected freezing events from occurring. The coordinates of this shaded triangle are expressed in weight percent of the three components of the phase diagram (i.e., KOH, $H_2O_2$, and $H_2O$ in that exact order) and are as follows: (26.4, 16.0, 57.6) for the top point, (62.3, 37.7, 0.0) for the left bottom point nearest the KOH scale, and (46.8, 53.2, 0.0) for the right bottom point nearest the $H_2O_2$ scale.

Figure 8:
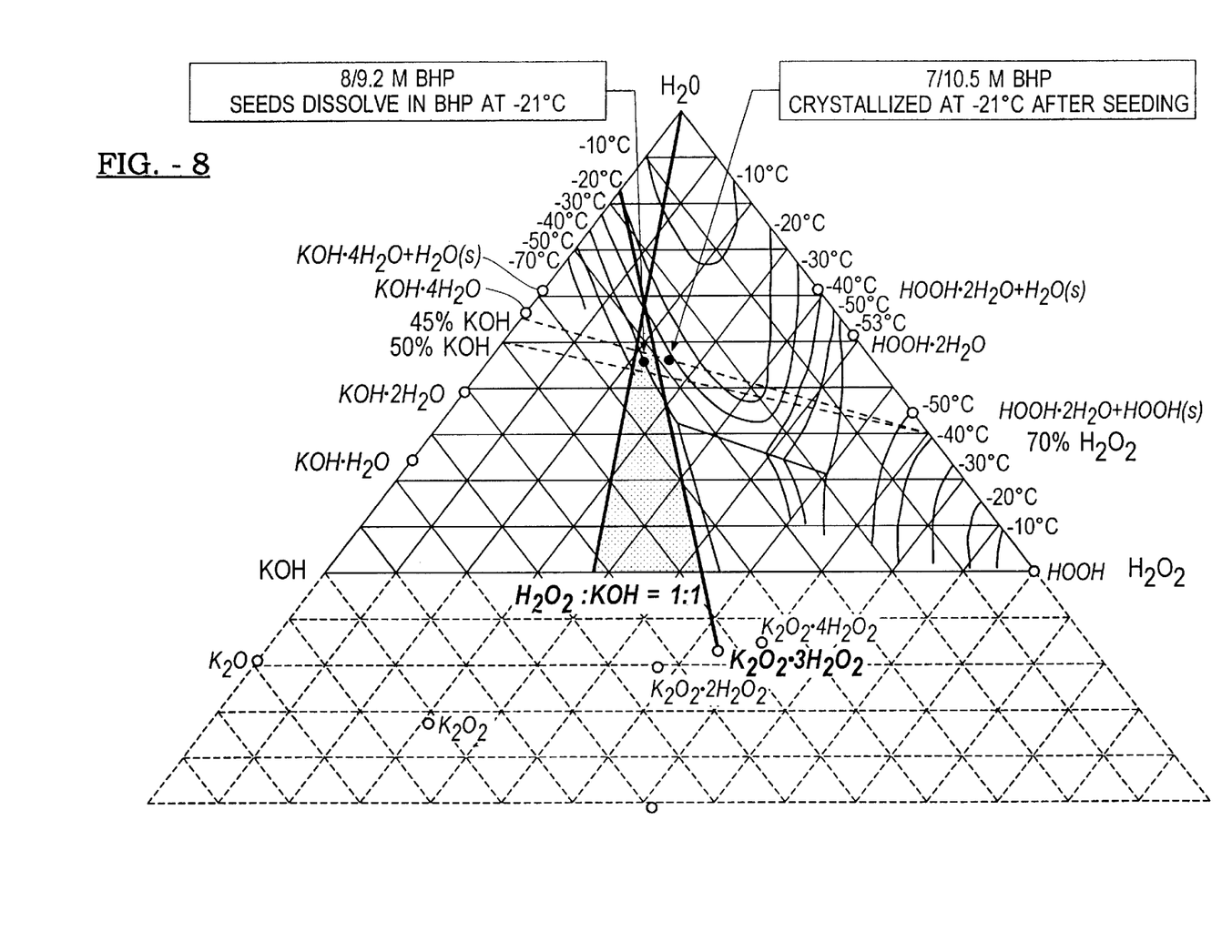
FIG. 8 is an illustration of the BHP phase diagram depicted in FIG. 7, showing the composition of two BHP's, one just to the right of the "$K_2O_2.3H_2O_2$" boundary line and the other just to the left of the "$K_2O_2.3H_2O_2$" boundary line.

Referring to FIG. 8, the two black dots show the composition of two BHPs, one just to the right of the "$K_2O_2.3H_2O_2$" boundary line and the other one just to the left of the boundary line. Test results presented below indicate that the BHP on the right of the boundary line crystallizes at $-21°$ C., and the BHP on the left of the boundary line does not crystallize at $-21°$ C. In deed, the one on the left side of the boundary line actually dissolves the seeds. Thus, any BHP composition that falls within the shaded area of FIGS. 7 and 8 is suitable for practicing the present invention. That is, these BHP compositions do not freeze or crystallize when maintained at temperatures down to $-21°$ C., even after being subjected to one or more seeding procedures. Again, the coordinates of this shaded triangle are expressed in weight percent of the three components of the phase diagram (i.e., KOH, $H_2O_2$, and $H_2O$ in that exact order) and are as follows: (26.4, 16.0, 57.6) for the top point, (62.3, 37.7, 0.0) for the left bottom point nearest the KOH scale, and (46.8, 53.2, 0.0) for the right bottom point nearest the $H_2O_2$ scale.

The point to the right of the "$K_2O_2.3H_2O_2$" boundary line in FIG. 8 is the traditional 7/10.5 M BHP prepared from 45% KOH and 70% $H_2O_2$. According to Dobrynina, et al., the freezing point of 7/10.5 M BHP is $-31°$ C. The COIL system is typically operated at around $-20°$ C. or $-21°$ C. Thus, the operating temperature is 10° C. above the accepted freezing.

Figure 9:
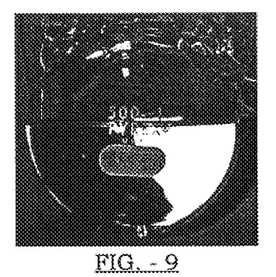
FIG. 9 is a photographic illustration of a flask containing 7/10.5 M BHP at −21° C. before seeding.

Referring to FIG. 9, a flask containing 7/10.5 M BHP at $-21°$ C. before seeding is shown. It is a clear liquid with no solids.

Figure 10:
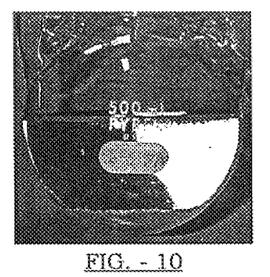
FIG. 10 is a photographic illustration of a flask containing 7/10.5 M BHP at −21° C. after seeding.

Referring to FIG. 10, the same flask containing 7/10.5 M BHP at $-21°$ C. after seeding is shown.

As FIG. 10 illustrates, 7/10.5 M BHP crystallizes at $-21°$ C. when nucleation seeds are introduced. The composition of the crystals correspond to $K_2O_2.3H_2O_2$ or equivalently to $KOOH—H_2O_2$. Thus, liquid 7/10.5 M BHP is not at equilibrium at $-21°$ C.. It is super-cooled and will crystallize after nucleation sites form. The "anomalous" freezing incidents are not really anomalies. They occur because the system is being operated in a metastable state at non-equilibrium conditions.

Figure 11:
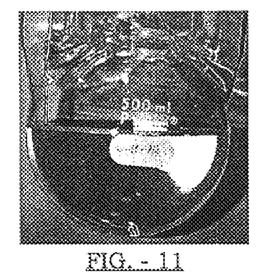
FIG. 11 is a photographic illustration of a flask containing 8/9.2 M BHP after sitting overnight at −21° C. and before seeding.

Referring to FIG. 11, a flask containing 8/9.2 M BHP at $-21°$ C. that has sat overnight and has not been seeded is shown. Its composition is just to the left of the "$K_2O_2.3H_2O_2$" boundary line in FIG. 8. It is a clear liquid with no solids. (The white shape at the bottom of the flask is a light reflection.)

Figure 12:
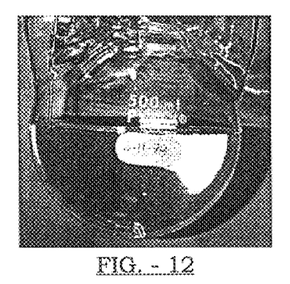
FIG. 12 is a photographic illustration of a flask containing 819.2 M BHP after seeding.

Referring to FIG. 12, the same flask containing 8/9.2 M BHP at $-21°$ C. after seeding is shown. There are no solids and crystallization did not occur. Instead, the seed dissolved in the BHP.

Figure 13:
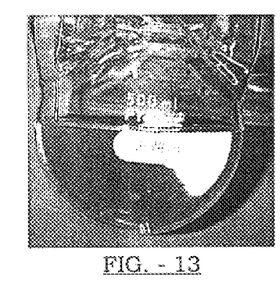
FIG. 13 is a photographic illustration of a flask containing 8/9.2 M BHP at −21° C. after a repeat seeding.

Referring to FIG. 13, in order to confirm the results shown in FIG. 12, the 8/9.2 M BHP was seeded again with triple the amount of seed and stirred vigorously. The seed dissolved again. Crystallization did not occur. The 8/9.2 M BHP remained a clear liquid with no solids at $-21°$ C. as shown in FIG. 13.

Referring again to FIG. 8, the composition of the 7/10.5 M BHP and the 8/9.2 M BHP are not very different. What distinguishes them is that they are on opposite sides of the $K_2O_2.3H_2O_2$ boundary line. The present invention demonstrates that 7/10.5 M BHP is really super-cooled at $-21°$ C. When a sufficient number of nucleation seeds form or are introduced, 7/10.5 M BHP crystallizes forming crystals with a composition $K_2O_2.3H_2O_2$. On the left side of the $K_2O_2.3H_2O_2$ boundary line, $K_2O_2.3H_2O_2$ cannot form at $-20°$ C. and the "anomalous" freezing events cannot occur. The present invention demonstrates that 8/9.2 M BHP, which is just to the left of the $K_2O_2.3H_2O_2$ boundary line, does not crystallize at $-21°$ C. when seeded. Instead, the seed dissolves.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:

1. A basic hydrogen peroxide composition, wherein the basic hydrogen peroxide is formed by mixing aqueous potassium hydroxide and aqueous hydrogen peroxide in a mole ratio such that the resulting basic hydrogen peroxide composition does not crystallize when maintained at a temperature down to $-21°$ C.

2. The invention according to claim 1, wherein the mole ratio of hydrogen peroxide to potassium hydroxide corresponds to a composition represented by at least one location within a triangular region on a triangular phase diagram which is substantially bounded by the shortest line having coordinates (26.4, 16.0, 57.6), (62.3, 37.7, 0.0), and (46.8, 53.2, 0.0), wherein these coordinates correspond to the respective weight percentages of potassium hydroxide, hydrogen peroxide and water.

3. The invention according to claim 1, wherein the mole ratio of hydrogen peroxide to potassium hydroxide is 1:1.

4. The invention according to claim A, wherein the mole ratio of hydrogen peroxide to potassium hydroxide is greater than 1:1.

5. The invention according to claim 1, wherein the mole ratio of hydrogen peroxide to potassium hydroxide is 9.2 to 8.

6. A basic hydrogen peroxide composition, wherein the basic hydrogen peroxide is formed by mixing aqueous potassium hydroxide and aqueous hydrogen peroxide, wherein the mole ratio of hydrogen peroxide to potassium hydroxide corresponds to a composition represented by at least one location within a triangular region on a triangular phase diagram which is substantially bounded by the shortest line having coordinates (26.4, 16.0, 57.6), (62.3, 37.7, 0.0), and (46.8, 53.2, 0.0), wherein these coordinates correspond to the respective weight percentages of potassium hydroxide, hydrogen peroxide and water.

7. The invention according to claim 6, wherein the basic hydrogen peroxide composition does not crystallize when maintained at a temperature down to −21° C.

8. The invention according to claim 6, wherein the mole ratio of hydrogen peroxide to potassium hydroxide is 1:1.

9. The invention according to claim 6, wherein the mole ratio of hydrogen peroxide to potassium hydroxide is greater than 1:1.

* * * * *

UNITED STATES PATENT AND TRADEMARK OFFICE
CERTIFICATE OF CORRECTION

PATENT NO. : 6,224,786 B1
DATED : May 1, 2001
INVENTOR(S) : David Stelman

It is certified that error appears in the above-identified patent and that said Letters Patent is hereby corrected as shown below:

<u>Column 4,</u>
Line 32, "IOC" should be -- 10ºC --

<u>Column 5,</u>
Line 7, "-200C" should be -- -20ºC --
Line 26, after "was", delete "been".

<u>Column 6,</u>
Line 66, after "3C" insert -- is --.

<u>Column 7,</u>
Line 5, after "-20" insert -- º --.
Line 26, "819.2" should be -- 8/9.2 --.
Line 50, "identity" should be -- identify --.

<u>Column 11,</u>
Line 5, "A" should be -- 1 --

Signed and Sealed this

Eleventh Day of June, 2002

*Attest:*

JAMES E. ROGAN
*Director of the United States Patent and Trademark Office*

*Attesting Officer*